(12) United States Patent
Kurrle et al.

(10) Patent No.: US 8,249,771 B2
(45) Date of Patent: Aug. 21, 2012

(54) METHOD FOR DETECTING AN ERROR IN A COMPONENT ASSEMBLY

(75) Inventors: Bernhard Kurrle, Stuttgart (DE); Marc Chaineux, Stuttgart (DE); Andreas Feldges, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 510 days.

(21) Appl. No.: 12/437,284

(22) Filed: May 7, 2009

(65) Prior Publication Data

US 2010/0023200 A1   Jan. 28, 2010

(30) Foreign Application Priority Data

Jul. 28, 2008  (DE) .......................... 10 2008 040 796

(51) Int. Cl.
  *G01M 17/00* (2006.01)
(52) U.S. Cl. ..................... 701/29.2; 701/31.7
(58) Field of Classification Search .................... 701/29, 701/29.1, 29.2, 31.7, 34.4, 36; 340/438, 340/439

See application file for complete search history.

(56) References Cited

U.S. PATENT DOCUMENTS

| 5,651,247 | A | * | 7/1997 | Frankle ........................... 60/274 |
| 6,063,350 | A | * | 5/2000 | Tarabulski et al. .......... 423/239.1 |
| 6,082,102 | A | * | 7/2000 | Wissler et al. .................. 60/286 |
| 6,363,771 | B1 | * | 4/2002 | Liang et al. ................... 73/23.31 |
| 2005/0207936 | A1 | * | 9/2005 | Berryhill et al. ................ 422/63 |
| 2007/0265742 | A1 | * | 11/2007 | Thiel et al. ....................... 701/29 |

FOREIGN PATENT DOCUMENTS

DE    10 2005 041 660    3/2007

* cited by examiner

*Primary Examiner* — David Dunn
*Assistant Examiner* — Philip Gabler
(74) *Attorney, Agent, or Firm* — Merchant & Gould P.C

(57) ABSTRACT

The invention relates to a method for detecting an error in a component assembly of a motor vehicle, the component assembly having a functional control unit and at least one function module to be controlled by the functional control unit as components. According to the method, a check is made by the functional control unit to determine whether a combination of individual errors is present for at least one component of the component assembly. When the combination of individual errors is thereby present, an occurrence of the error is verified by the functional control unit and a signal for implementing an emergency functional strategy is transmitted by said control unit to an engine control unit.

9 Claims, 1 Drawing Sheet

METHOD FOR DETECTING AN ERROR IN A COMPONENT ASSEMBLY

TECHNICAL FIELD

The invention relates to a method for detecting an error in a component assembly, an arrangement for detecting an error in a component assembly, a computer program and a computer program product.

BACKGROUND

In order to implement governmental exhaust gas emission standards, provision is made among other things to reduce nitrogen dioxides $NO_x$ with the aid of a urea-water solution (HWL) via a catalytic converter in the exhaust gas tract. In so doing, the urea-water solution in the exhaust gas is converted into ammonia, which is deposited in the catalytic converter and reduces the $NO_x$ amounts. This method is denoted as selective catalytic reduction (SCR). The quantity of urea-water solution to be metered is ascertained in a separate metering strategy and is metered independent of boundary conditions by associated hydraulics and an electrical system.

The publication DE 10 2005 041 660 A1 relates to a method for introducing a reagent material into the exhaust gas region of an internal combustion engine and a device for implementing the method. According to said method, the reagent material, which is subjected to a reagent pressure, is metered by a reagent metering device as a function of a reagent signal. Furthermore, the pressure difference is ascertained between the reagent pressure and the exhaust gas pressure. The reagent signal is subsequently manipulated as a function of the pressure difference. With this method, the pressure difference can be taken into account and be used for correcting the reagent signal so that an under- or overmetering of the reagent material can be avoided.

SUMMARY

The invention relates to a method for detecting an error in a component assembly of a motor vehicle, the component assembly having a functional control unit and at least one function module to be controlled by the functional control unit as components. According to the method, a check is made by the functional control unit to determine whether a combination of individual errors is present for at least one component of the component assembly. When the combination of individual errors is thereby present, an occurrence of the error is verified by the functional control unit and a signal for implementing an emergency functional strategy is transmitted by said control unit to an engine control unit.

In a configuration of the method, the occurrence of an error is verified if the functional control unit has at least one individual error. In this case, a control of the component assembly, i.e. the functional control unit and at least the one function module, is usually no longer guaranteed if the functional control unit is provided for controlling at least the one function module and in so doing by means of a closed-loop and/or open-loop control.

The method can be alternatively or additionally implemented for a component assembly, which is configured for the purpose of providing a required operating supply item for the implementation of a motor vehicle function, at least one status parameter of the operating supply item being controlled by at least the one function module, i.e. controlled in an open loop and/or closed loop and being thereby monitored among other things. In so doing, a check is made to determine whether at least the one function module has at least one individual error. The occurrence of the error is verified if the combination of the existing individual errors does not allow for an assertion about the status of the operating supply item. Provision can be made in a variation of the method for the occurrence of the error to be verified if all of the function modules have at least one individual error.

The operating supply item is typically an operating resource or an operating medium, which is required for the implementation of a function of the motor vehicle and is consumed during the operation and/or is altered, for example, by contamination. A check of the operating supply item can therefore be made to determine whether said item is present in a sufficient quantity and/or quality. Said check of the quantity and/or quality of the operating supply item usually results by means of at least the one function module. The operating supply item can furthermore be provided for a function by at least the one function module.

The operating supply item relates in its embodiment to a urea-water solution or if need be a lubricant. Depending on the function of at least the one function module, the presence of a combination of individual errors can have a definite relevance. In the event that a first function module has a first individual error and a second function module does not have an individual error, that can imply that overall, respectively in combination, no error is present if despite the one individual error, a check of the quantity and/or quality of the operating supply item by the second function module is nevertheless possible to a sufficient extent.

In the event that provision is made for a urea-water solution to be the operating supply item, a first function module can be configured as a fill level sensor and the second function module as a pressure sensor for checking the pressure of the urea-water solution. In the event that both function modules should be defective and thereby inaccurate, an error is usually present, to which the emergency functional strategy can react. This is the case because the urea-water solution is no longer checked to determine if it is present in sufficient quantity.

A balancing of conditions for the presence of an error on the basis of the combination of individual errors can take place with a comparative matrix.

The emergency functional strategy, which is usually implemented by the engine control unit in the event that the functional control unit signals the error, can comprise a warning strategy and/or a cut-off strategy. In the event that the emergency functional strategy comprises a warning strategy, an operator of the motor vehicle is provided with a warning signal when the error occurs. In this way, the operator is provided with a signal concerning the presence of at least the one error. In the event that the emergency functional strategy comprises a cut-off strategy, the engine control unit controls the engine in such a way that an operation of the engine is prevented when the error occurs. The latter case can, for example, mean that a restarting of the engine is not allowed.

The invention also relates to an arrangement, which has an engine control unit and a functional control unit and is configured to detect an error in a component assembly of a motor vehicle. The component assembly thereby has the functional control unit and at least one function module to be controlled by the functional control unit as components, the functional control unit being configured for the purpose of checking to determine whether a combination of individual errors exists for at least one component of the component assembly. Furthermore when a combination of the individual errors exists, the occurrence of the error is to be verified by the functional control unit and a signal for the implementation of an emergency functional strategy is to be transmitted by the functional control unit to the engine control unit.

The functional control unit can have a diagnostic management module, which is configured for the purpose of checking to determine whether the combination of the individual errors exists. The functional control unit can alternatively or additionally have at least one function identifier, for example as a component of the diagnostic management module, for the verification of an individual error, at least the one function identifier being blocked out when at least the one individual error, for example concerning an error status, exists.

Within the component assembly, the functional control unit can be configured to control, respectively to control in an open loop and/or to control in a closed loop, a selective catalytic reduction and in so doing also typically at least the one function module. In a variation, the arrangement has at least one function module of the component assembly, at least the one function module being configured for the purpose of controlling a status of an operating supply item configured as a urea-water solution (HWL) and consequently for the purpose of monitoring customarily by sensors. This can mean that, for example, a fill level height of the urea-water solution in a tank, a pressure of the urea-water solution or another parameter, which provides qualitative and/or quantitative assertions about the status of the urea-water solution, is acquired. At least the one function module can also be configured for the purpose of providing the urea-water solution for an application and in so doing to process said solution, for example by a change in temperature, and/or to meter it in a suitable quantity for the application.

In the event that the method is implemented for a component assembly, which is configured for providing a urea-water solution, functions for the implementation of the warning and/or cut-off strategy are implemented in the engine control unit, which is of overriding importance with respect to the functional control unit. Adjustment functions for monitoring and/or providing the urea-water solution are implemented in the functional control unit.

The arrangement described is configured for the purpose of carrying out all of the steps of the present method. In so doing, individual steps of this method can also be carried out by individual components of the arrangement. Furthermore, functions of the arrangement or functions of the individual components of the arrangement can be implemented as steps of the method.

The invention further relates to a computer program with program code means for carrying out all steps of a method described if the computer program is run on a computer or in an equivalent processing unit, in particular in an arrangement according to the invention.

The computer program product according to the invention with program code means, which are stored on a computer-readable data carrier, is configured for the implementation of all of the steps of a method described if the computer program is run on a computer or in an equivalent processing unit, in particular in an arrangement according to the invention.

The SCR-functions as a function of the topology of the control unit and resource availability are usually divided into two control units, i.e. the engine control unit and the functional control unit. The functions for the warning and cut-off strategy are thereby usually placed in the engine control unit, whereas adjustment functions as well as if need be existing individual errors in the SCR system can be calculated in a separate control unit, usually the functional control unit.

In the event that the SCR-functions, respectively the functions for the selective catalytic reduction, are apportioned to two control units, the warning and cut-off strategy is implemented if a serious error, typically in the second control unit, is signaled to the engine control unit. The exchange of data, which comprise, for example, items of information, usually takes place via an interface, for example a CAN network.

The warning and cut-off strategies required by law, with which an operator of a motor vehicle is disposed to refuel with a urea-water solution (HWL), can be implemented with the invention. Said strategies are usually activated when the level falls below a defined tank fill level or a remaining cruising range. In so doing, the number of engine start-ups, respectively the distance traveled, since a refueling prompt, is counted down. If the maximally admissible number of engine start-ups has elapsed or the operator has traveled the maximum remaining cruising range without refueling, a restarting of the engine can be locked out. In the event that individual errors occur in the function modules, which monitor the tank fill level, the number of engine start-ups or the distance traveled, during the operation of the engine, a combination of individual errors may be present.

As a configuration of the invention, particular individual errors as well as combinations of individual errors are observed. This can, for example, be carried out with the aid of the diagnostic system management (OSM). As a configuration of the invention, a functional control unit error can be placed in a hierarchy above an arbitrary individual error. This results by an assigned error attaching via a function identifier (Fid, in this instance Fid_SCRPODRCntEnbl). The second possibility is a combination of two individual errors, which must be present at the same time. This is implemented via two additional function identifiers, FIDs, (in this instance Fid_SCRPODPresRCnfEnbl and Fid_SCRPODLvlRCntEnbl). The error is displayed only if both function identifiers, FIDs, are blocked via corresponding error statuses. Depending on its manifestation the balancing of adjacent conditions can also be implemented via a bitwise comparative matrix.

If, for example, a defect and thereby an individual error is in each case present at the fill level sensor and in a function module for a pressure build-up, an empty tank is suggested. The tank fill level can no longer be evaluated and the component assemblies, respectively the system, can no longer build up any pressure to meter the urea-water solution. The presence of an error from this can then, for example, be transmitted to the engine control unit via an interface configured as a CAN network (Controller area network).

Additional advantages and configurations of the invention result from the description and the accompanying drawings.

It is to be understood that the characteristics mentioned above and those to be explained below are not only applicable in the combination, which is stated in each case, but also in other combinations or as independent entities without departing from the scope of the invention at hand.

Figure 1:
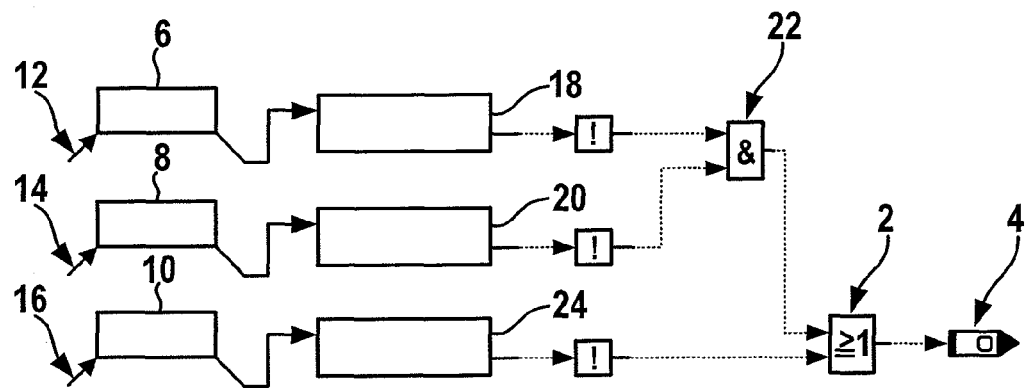
FIG. 1 shows a diagram for analyzing a combination of individual errors in a schematic depiction.

The invention is schematically depicted in the drawings on the basis of embodiments and is described below in detail while referring to the drawings.

The figures are coherently and comprehensively described, like reference numerals designating like components.

DETAILED DESCRIPTION

The diagram depicted in FIG. 1 shows how an error 2 in a component assembly, which has a functional control unit as well as two function modules, the component assembly being designed to provide an operating supply item configured as a urea-water solution, is ascertained and how through the implementation of an emergency functional strategy a signal for displaying an error status 4 is transmitted to an engine control unit.

For this purpose, the functional control unit has a module for diagnostic system management (OSM). This module comprises in this instance three function identifiers 6, 8, 10. In so doing, a first function identifier 6 (Fid_SCRPODPresR-CntEnbl) is configured for the identification of a first individual error 12, which relates to a module for the pressure build-up in a urea-water solution. A second function identifier 8 (Fid_SCRPODLvlRCntEnbl) is configured for the identification of an individual error 14 of a function module for checking a fill level of the urea-water solution. A third function identifier 10 (Fid, in this instance Fid_SCRPODRCntEnbl) is configured for the identification of a third individual error 16, which relates to a function of the functional control unit.

Provision is made in the first case for the two first individual errors 12, 14 to be present for the function module. In the event that these first two individual errors 12, 14 are identified by the respective function identifiers 6, 8, a first signal 18 is supplied by the first function identifier 6 and a second signal 20 by the second function identifier 8. Upon the condition 22, which is to be checked, that both individual errors 12, 14 are present, the error 2 is transmitted in the present example as an error status 4 (SCRPOD_stSetRstrcnDeb) to the engine control unit via a CAN network so that the emergency functional strategy is implemented by the engine control unit.

In this case, the error 2 is thus only then present if both individual errors 12, 14 for the function modules are simultaneously present. Because both function modules are in fact faulty when both individual errors are present, it is no longer possible to check how much urea-water solution is from now on available. In the event, however, only one of the two function modules should be faulty so that only one of the two individual errors 12, 14 is present, it can still be possible to make a sufficiently qualitative and/or quantitative assertion about the status of the urea-water solution. This is the case because either the fill level of the urea-water solution can be checked via the first function module or the pressure of the urea-water solution via the second function module. In the event that only one of the two individual errors 12, 14 is present, a signal about the presence of the error 2 is not transferred to the engine control unit in the embodiment at hand.

The situation behaves differently when the third individual error is present, which relates to a function of the functional control unit, said control unit being configured to control and consequently to control in an open loop and/or a closed loop the two function modules. When the third individual error for the functional control unit is present, a functionality of the component assembly, which is configured to provide the urea-water solution, is no longer guaranteed with certainty. In this case, a third signal 24 is provided by the third function identifier 10. The presence of the third individual error 16 simultaneously implies the presence of the error 2, which is likewise transmitted as an error status 4 (SCRPOD_stSetRstrcnDeb) to the engine control unit.

Figure 2:
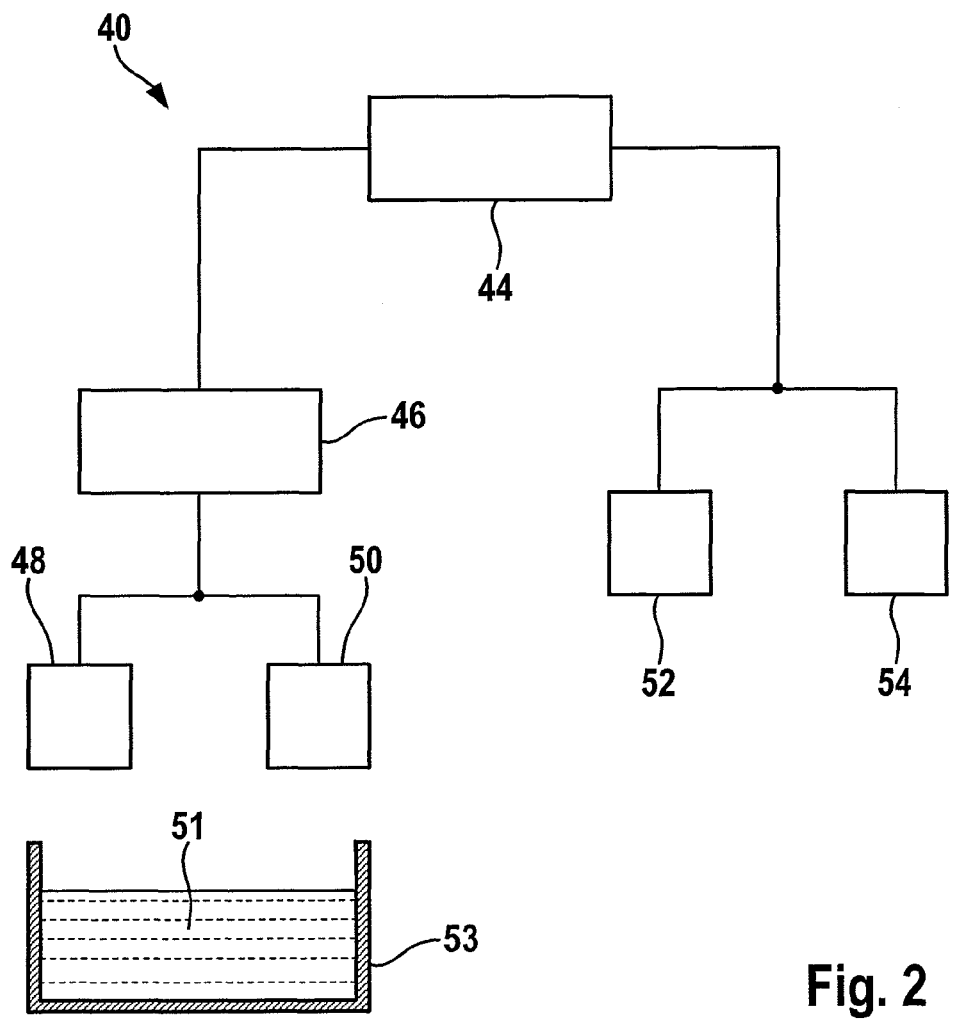
FIG. 2 shows a configuration of an embodiment of the invention in a schematic depiction.

FIG. 2 shows a constellation, which has an embodiment of an arrangement 40 according to the invention for ascertaining an error 42 of a component assembly 42 of a motor vehicle, in schematic depiction. The arrangement 40 thereby comprises an engine control unit 44 as well as a functional control unit 46. This functional control unit 46 is simultaneously configured as a component of the component assembly 42. Said component furthermore comprises a first function module 48 and a second function module 50.

The component assembly 42 described is configured to provide a urea-water solution 51, which is configured to carry out a selective catalytic reduction (SCR) for a catalytic converter of a motor vehicle. In so doing, the first function module 48 is configured to check a height of a fill level of the urea-water solution 51 in a tank 53. The second function module 50 is configured to check a pressure of the urea-water solution 51. The functional control unit 46 is configured for the purpose of controlling a status of the urea-water solution 51 by controlling the two function modules 48, 50, i.e. controlling in a closed loop and/or an open loop and thereby monitoring said status. Said control unit 46 is also configured to provide said urea-water solution 51 to a catalytic converter.

During an operation of the component assembly, the situation can arise that at least one of the components of the component assemblies has itself in each case an individual error. In the present case, this relates to the functional control unit 46 as well as the two function modules 48, 50. Within the scope of an embodiment of the method according to the invention, provision is made for the functional control unit 46 to furthermore be configured to check whether a combination of individual errors is present for at least one of the components, be it now the functional control unit 46 or one of the function modules 48, 50 of the component assembly 42. In the event that a combination of individual errors is present, an occurrence of an error is verified by the functional control unit 46. If the combination of individual errors and the thereby the error is present, a signal for the implementation of an emergency functional strategy is furthermore transmitted by the functional control unit 46 to the engine control unit 44.

Provision is made in a first example for the functional control unit 46 to have an individual error, whereas no individual error is present for the two function modules 48, 50. However, because a functionality of the component assembly 42 for providing the urea-water solution is no longer guaranteed when an individual error is present for the functional control unit 46, this implies that a combination of individual errors is already present when the individual error for the functional control unit 46 is present. Said combination of individual errors furthermore establishes the occurrence of an error so that the signal concerning the presence of the error is transmitted to the engine control unit 44.

Provision can, however, also be made for only one of the two function modules 48, 50 to have an individual error. In the event that the first individual error for the first function module 48 is present, this implies that a fill level height of the urea-water solution 51 can no longer be controlled in the embodiment at hand. However, because the second function module 50 does not have an individual error so that the pressure of the urea-water solution 51 can continue to be checked, a check of the status of the urea-water solution 51 is still possible, albeit only in a limited sense, so that the transmission of the signal concerning the presence of the error to the engine control unit 44 is not necessary.

A similar situation occurs in the event that the first function module 48 is without error, however, the second function module 50, via which a pressure of the urea-water solution 51 can be checked, has one individual error. In this case it is also still possible to make an assertion about the status of the urea-water solution 51 by means of the first function module 48. In so doing, it is altogether not necessary to signal the error to the engine control unit 44.

Only in the case that an individual error should be simultaneously present for both function modules 48, 50, a combination of individual errors is given, which make a signaling of an error by the functional control unit 46 for the engine control unit 44 necessary because in this case a check of the status of the urea-water solution 51 is neither possible via a fill level height nor via a pressure of the urea-water solution.

With regard to the embodiment of the component assembly 42 described here, it is to be asserted that the components of the component assembly 42 are arranged in two hierarchal levels, the functional control unit 46 being arranged with overriding importance with respect to the two function modules 48, 50, which are classified as equal. A condition for the error being present can thus also be so defined that all of the components of a hierarchal level respectively have an individual error.

In the event that an error is now signaled to the engine control unit 44 by the functional control unit 46 on the basis of the combination of existing individual errors, provision is furthermore made within the scope of the method for an emergency functional strategy to be implemented by the engine control unit 44. In the embodiment at hand, the emergency functional strategy comprises a warning strategy as well as a cut-off strategy. In the event that the cut-off strategy is to be implemented, an appropriate signal is transmitted by the engine control unit 44 to a display module 52 in the embodiment at hand so that an operator of the motor vehicle is notified via the display module 52 that the error is present.

The warning strategy can also alternatively or additionally be implemented. This means that the engine control unit 44 acts upon an engine 54 of the motor vehicle in such a way that a restarting of the motor vehicle is not possible when the error is present.

The invention claimed is:

1. A method of detecting errors in a component assembly of a motor vehicle, wherein the component assembly includes a functional control unit and at least two function modules that are controlled by the functional control unit, the method comprising:
    checking with the functional control unit to determine if individual errors are present for at least the two function modules of the component assembly;
    checking with the functional control unit to determine if an error with the functional control unit is present; and
    transmitting a signal for implementing an emergency functional strategy from said functional control unit to an engine control unit of the motor vehicle when the individual errors are present for at least the two function modules of the component assembly or when the error with the functional control unit is present.

2. The method according to claim 1, further comprising:
    checking to determine whether the at least two function modules of the component assembly have at least one of the individual errors, wherein the component assembly is configured for providing an operating supply item required for implementation of a motor vehicle function, wherein at least one status parameter of the operating supply item is controlled by at least one of the two function modules; and
    verifying an occurrence of the error with the functional control unit or the individual errors of at least the two function modules of the component assembly if a combination of currently present individual errors does not allow for an assertion about a status of the operating supply item.

3. The method of claim 1, further comprising verifying an occurrence of the error with the functional control unit or the individual errors of at least the two function modules of the component assembly if at least one of the two function modules has at least one of the individual errors.

4. The method of claim 1, wherein the emergency functional strategy comprises a warning strategy so that a warning signal is provided by the engine control unit to an operator of the motor vehicle when the error with the functional control unit or the individual errors of at least the two function modules of the component assembly occurs.

5. The method of claim 1, wherein the emergency functional strategy comprises a cut-off strategy so that when the error with the functional control unit or the individual errors of at least the two function modules of the component assembly occurs the engine control unit controls an engine of the motor vehicle in such a way that an operation of the engine is prevented.

6. An arrangement, comprising:
    an engine control unit; and
    a functional control unit that includes a diagnostic management module;
    wherein the arrangement is configured to detect an error in a component assembly of a motor vehicle, wherein the component assembly has the functional control unit and at least two function modules that are controlled by the functional control unit as components, wherein the functional control unit is configured for checking whether a combination of individual errors is present for at least one component of the component assembly, wherein an occurrence of the error is verified by the functional control unit when the combination of the individual errors is present and a signal for implementation of an emergency functional strategy is transmitted from the functional control unit to the engine control unit;
    wherein the diagnostic management module is configured for checking whether the combination of the individual errors is present; and
    wherein the functional control unit has at least one function identifier for verifying at least one of the individual errors, the at least one function identifier being blocked when the at least one individual error is present.

7. The arrangement of claim 6, wherein the functional control unit is configured for control of a selective catalytic reduction, and wherein the arrangement includes at least one of the at least two function modules of the component assembly, the at least one function module configured for controlling a status of an operating supply item that is configured as a urea-water solution.

8. A computer program with a program code that is stored on a computer-readable non-transitory data carrier to implement, if the computer program is executed on a computer, a method of detecting an error in a component assembly of a motor vehicle, wherein the component assembly includes a functional control unit and at least two function modules that are controlled by the functional control unit, the method comprising: checking with the functional control unit if a combination of individual errors is present for at least two components of the component assembly; verifying an occurrence of an error with the functional control unit; and transmitting a signal for implementing an emergency functional strategy from said functional control unit to an engine control unit when the combination of the individual errors is present or when the error with the functional control unit occurs.

9. A computer program product with a program code that is stored on a computer-readable non-transitory data carrier to implement, if the computer program product is executed on a computer, a method of detecting an error in a component assembly of a motor vehicle, wherein the component assembly includes a functional control unit and at least two function modules that are controlled by the functional control unit, the method comprising:

checking with the functional control unit if a combination of individual errors is present for at least one component of the component assembly; verifying an occurrence of an error with the functional control unit; and transmitting a signal for implementing an emergency functional strategy from said functional control unit to an engine control unit when the combination of individual errors is present or when the error with the functional control unit occurs.

* * * * *